United States Patent
Zhang et al.

(10) Patent No.: US 11,102,115 B2
(45) Date of Patent: Aug. 24, 2021

(54) FORWARDING PACKET

(71) Applicant: NEW H3C TECHNOLOGIES CO., LTD., Hangzhou (CN)

(72) Inventors: Yang Zhang, Beijing (CN); Ling Kuang, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 0 days.

(21) Appl. No.: 16/618,781

(22) PCT Filed: May 31, 2018

(86) PCT No.: PCT/CN2018/089224
§ 371 (c)(1),
(2) Date: Dec. 2, 2019

(87) PCT Pub. No.: WO2018/219319
PCT Pub. Date: Dec. 6, 2018

(65) Prior Publication Data
US 2020/0136967 A1   Apr. 30, 2020

(30) Foreign Application Priority Data

May 31, 2017 (CN) .......................... 201710399886.5

(51) Int. Cl.
*H04L 12/741* (2013.01)
*H04L 29/12* (2006.01)
(Continued)

(52) U.S. Cl.
CPC .............. *H04L 45/74* (2013.01); *H04L 45/24* (2013.01); *H04L 49/354* (2013.01);
(Continued)

(58) Field of Classification Search
None
See application file for complete search history.

(56) References Cited

U.S. PATENT DOCUMENTS

| 7,088,737 B1 | 8/2006 | Carrel |
| 2003/0131133 A1* | 7/2003 | Nyu ........................ H04L 12/66 709/245 |

(Continued)

FOREIGN PATENT DOCUMENTS

| CN | 1516408 A | 7/2004 |
| CN | 101005437 A | 7/2007 |

(Continued)

OTHER PUBLICATIONS

"Standard for Local and Metropolitan Area Networks—Virtual Bridged Local Area Networks—Bridge Port Extension," IEEE Std 802.1BR-2012, Jul. 16, 2012, 135 pages.

(Continued)

*Primary Examiner* — Eunsook Choi
(74) *Attorney, Agent, or Firm* — McCoy Russell LLP

(57) ABSTRACT

According to an example of a method for forwarding a packet, a ESGW device decapsulates a received downstream data packet to obtain a downstream IP data packet when a destination MAC address of the downstream data packet is an MAC address of the ESGW device; determines a matching ARP entry of an IP address of a target user terminal based on the destination IP address of the downstream IP data packet to obtain a session ID of the target user terminal; determines a length field of a PPPoE header by a microcode, and obtains a pre-stored fixed-value field of the PPPoE header from a data storage area; encapsulates the downstream IP data packet into a downstream PPPoE data packet based on the session ID, the length field, and the fixed-value field, and forwards the downstream PPPoE data packet through an egress port of the matching ARP entry.

15 Claims, 5 Drawing Sheets

(51) Int. Cl.
- *H04L 12/707* (2013.01)
- *H04L 12/931* (2013.01)
- *H04L 29/06* (2006.01)

(52) U.S. Cl.
CPC ........ *H04L 61/103* (2013.01); *H04L 61/2503* (2013.01); *H04L 61/6022* (2013.01); *H04L 69/168* (2013.01); *H04L 69/22* (2013.01)

(56) References Cited

U.S. PATENT DOCUMENTS

| | | | |
|---|---|---|---|
| 2003/0154297 A1* | 8/2003 | Suzuki | H04L 29/06 709/229 |
| 2005/0286503 A1* | 12/2005 | Oda | H04L 63/162 370/355 |
| 2007/0076607 A1* | 4/2007 | Voit | H04L 61/2015 370/230 |
| 2007/0133558 A1* | 6/2007 | Wu | H04L 12/2859 370/395.5 |
| 2007/0133576 A1* | 6/2007 | Tsuge | H04L 41/0226 370/401 |
| 2008/0028077 A1 | 1/2008 | Kamata et al. | |
| 2009/0034525 A1* | 2/2009 | Wu | H04L 61/2596 370/389 |
| 2010/0309894 A1* | 12/2010 | Csaszar | H04L 12/4641 370/338 |
| 2011/0040892 A1* | 2/2011 | Amemiya | H04L 67/1027 709/235 |
| 2013/0010614 A1* | 1/2013 | Lin | H04L 69/08 370/250 |
| 2013/0250961 A1 | 9/2013 | Wu et al. | |
| 2014/0044129 A1 | 2/2014 | Mentze et al. | |
| 2014/0169377 A1 | 6/2014 | Shuai | |
| 2015/0339249 A1 | 11/2015 | Dharmadhikari et al. | |
| 2016/0124884 A1 | 5/2016 | Agarwal et al. | |
| 2016/0142474 A1 | 5/2016 | Itsumi et al. | |
| 2016/0205019 A1 | 7/2016 | Sundaram et al. | |
| 2017/0085488 A1 | 3/2017 | Bhattacharya et al. | |
| 2017/0093628 A1 | 3/2017 | Lin et al. | |

FOREIGN PATENT DOCUMENTS

| | | |
|---|---|---|
| CN | 101115014 A | 1/2008 |
| CN | 101257420 A | 9/2008 |
| CN | 102316028 A | 1/2012 |
| CN | 102377671 A | 3/2012 |
| CN | 104092595 A | 10/2014 |
| CN | 104125191 A | 10/2014 |
| CN | 104144157 A | 11/2014 |
| CN | 104639440 A | 5/2015 |
| CN | 104702438 A | 6/2015 |
| CN | 105099898 A | 11/2015 |
| CN | 105162732 A | 12/2015 |
| CN | 105337819 A | 2/2016 |
| CN | 105765889 A | 7/2016 |
| CN | 105827496 A | 8/2016 |
| CN | 105897467 A | 8/2016 |
| CN | 106254256 A | 12/2016 |
| CN | 106254281 A | 12/2016 |
| CN | 106453155 A | 2/2017 |
| CN | 106533946 A | 3/2017 |
| CN | 106559292 A | 4/2017 |
| CN | 106685818 A | 5/2017 |
| CN | 107547338 A | 1/2018 |
| CN | 108259633 A | 7/2018 |
| JP | 2005217661 A | 8/2005 |
| JP | 2014519249 A | 8/2014 |
| JP | 2017503405 A | 1/2017 |
| WO | 2011137782 A1 | 11/2011 |
| WO | 2016072972 A1 | 5/2016 |

OTHER PUBLICATIONS

ISA State Intellectual Property Office of the People's Republic of China, Written Opinion of the International Searching Authority Issued in Application No. PCT/CN2018/088622, dated Aug. 7, 2018, WIPO, 5 pages.

ISA State Intellectual Property Office of the People's Republic of China, Written Opinion of the International Searching Authority Issued in Application No. PCT/CN2018/089224, dated Aug. 14, 2018, WIPO, 5 pages.

European Patent Office, Extended European Search Report Issued in Application No. 18809668.9, dated Feb. 13, 2020, Germany, 8 pages.

European Patent Office, Extended European Search Report Issued in Application No. 18809298.5, dated Apr. 6, 2020, Germany, 7 pages.

State Intellectual Property Office of the People's Republic of China, Office Action and Search Report Issued in Application No. 201710209171.9, dated Apr. 23, 2020, 13 pages. (Submitted with Machine Translation).

State Intellectual Property Office of the People's Republic of China, Office Action and Search Report Issued in Application No. 201710400903.2, dated Sep. 7, 2020, 8 pages. (Submitted with Machine Translation).

Japanese Patent Office, Office Action Issued in Application No. 2019-566293, dated Nov. 17, 2020, 10 pages. (Submitted with Machine Translation).

State Intellectual Property Office of the People's Republic of China, Office Action and Search Report Issued in Application No. 201710400903.2, dated May 9, 2020, 17 pages. (Submitted with Machine Translation).

Shujun, H. et al., "Discussion on China Mobile's Evolution of Fixed-Line Network Architecture Based on SDN and NFV," China Mobile Research Institute, Feb. 23, 2017, 14 pages.

ISA State Intellectual Property Office of the People's Republic of China, International Search Report Issued in Application No. PCT/CN2018/088622, dated Aug. 7, 2018, WIPO, 4 pages.

ISA State Intellectual Property Office of the People's Republic of China, International Search Report Issued in Application No. PCT/CN2018/089224, dated Aug. 14, 2018, WIPO, 4 pages.

State Intellectual Property Office of the People's Republic of China, Office Action and Search Report Issued in Application No. 201710400903.2, dated Sep. 20, 2019, 15 pages. (Submitted with Partial Translation).

State Intellectual Property Office of the People's Republic of China, Office Action and Search Report Issued in Application No. 201710399886.5, dated Oct. 28, 2019, 10 pages. (Submitted with Partial Translation).

State Intellectual Property Office of the People's Republic of China, Office Action and Search Report Issued in Application No. 2017103397622.6, dated Oct. 29, 2019, 11 pages. (Submitted with Partial Translation).

State Intellectual Property Office of the People's Republic of China, Office Action and Search Report Issued in Application No. 201710397622.6, dated Oct. 29, 2019, 11 pages. (Submitted with Partial Translation).

Japanese Patent Office, Office Action Issued in Application No. 2019-566294, dated Jan. 5, 2021, 7 pages. (Submitted with Machine Translation).

European Patent Office, Office Action Issued in Application No. 18809298.5, dated Mar. 3, 2021, Germany, 3 pages.

Japanese Patent Office Action, Decision of Refusal Issued in Application No. 2019-566293, dated Jul. 6, 2021, 6 pages (Submitted with Machine Translation).

* cited by examiner

FORWARDING PACKET

CROSS-REFERENCE TO RELATED APPLICATIONS

The present application is a U.S. National Phase of International Patent Application Serial No. PCT/CN2018/089224 entitled "PACKET FORWARDING," filed on May 31, 2018. International Patent Application Serial No. PCT/CN2018/089224 claims priority to Chinese Patent Application No. 201710399886.5, filed on May 31, 2017. The entire contents of each of the above-cited applications are hereby incorporated by reference in their entirety for all purposes.

BACKGROUND

The present disclosure relates to forwarding a packet in a network communication.

With development of Software Defined Network (SDN) technology and Network Function Virtualization (NFV) technology, the key to improve future metropolitan area network and access network is to construct a comprehensive multi-service access edge for a multi-service convergence. A Broadband Remote Access Server (BRAS) device, being a core of the access edge, will be emphasized during reformation of the comprehensive multi-service access edge. One of the reformation solutions relating the BRAS for the comprehensive multi-service access edge is to implement the virtualization of the BRAS.

DETAILED DESCRIPTION OF THE EMBODIMENTS

To enable those skilled in the art to better understand the technical solutions in the examples of the present disclosure and make the above objectives, features, and advantages of the examples of the present disclosure more apparent and understandable, the technical solutions in the examples of the present disclosure will be further described in detail below in combination with the accompanying drawings.

Figure 1:
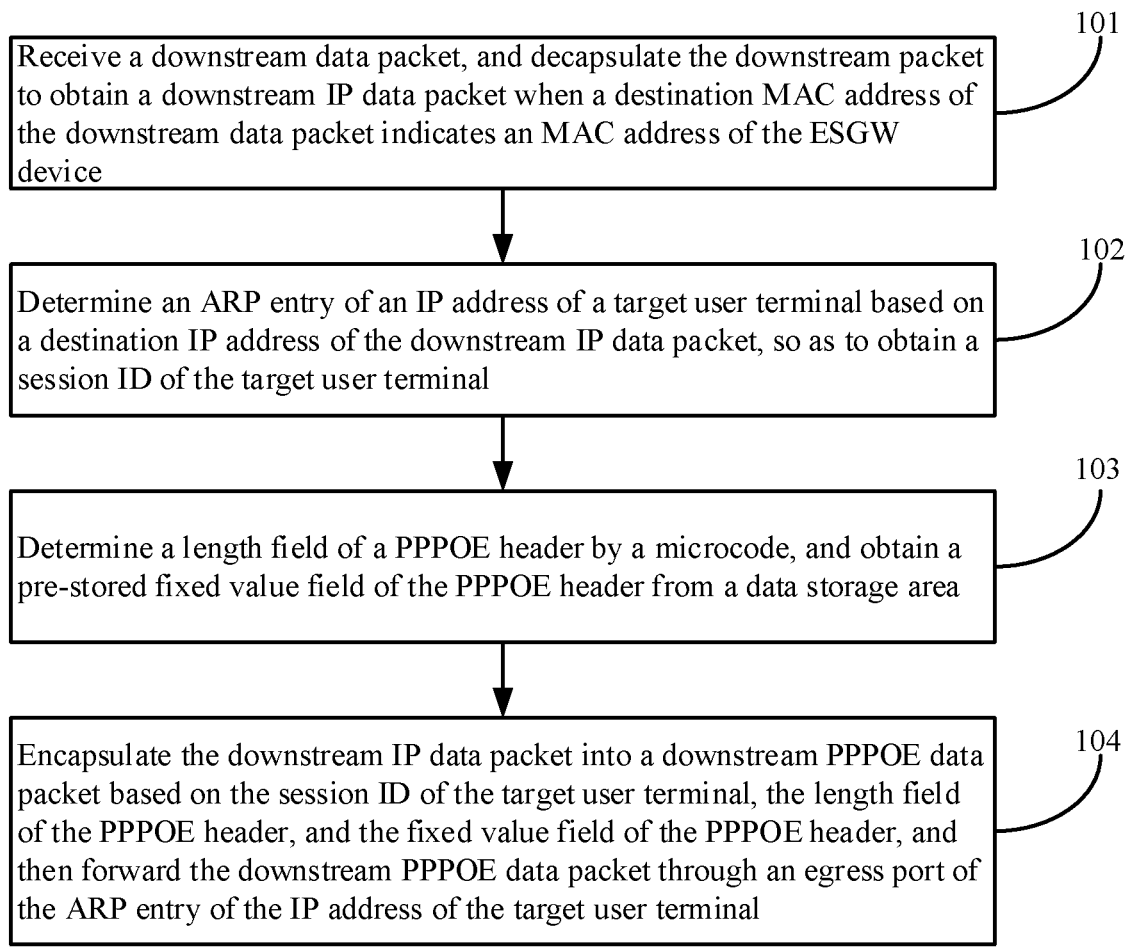
FIG. 1 is a schematic flowchart illustrating a method of forwarding a packet based on an example of the present disclosure.

FIG. 1 is a schematic flowchart illustrating a method of forwarding a packet based on an example of the present disclosure. The method of forwarding a packet may be applied to an Edge Stream Gateway (ESGW) device. As shown in FIG. 1, the method of forwarding a packet may include the following blocks.

At block 101, an ESGW device may receive a downstream data packet, and decapsulate the downstream packet to obtain a downstream Internet Protocol (IP) data packet when a destination Media Access Control (MAC) address of the downstream data packet indicates an MAC address of the ESGW device.

In an example of the present disclosure, when the downstream data packet is received, it may be required for the ESGW device to determine whether the destination MAC address of the downstream data packet is the MAC address of the ESGW device. If the determination result is yes, the received downstream data packet may be layer-3 forwarded by the ESGW device. Then, the received downstream data packet may be decapsulated by the ESGW device to obtain a downstream IP data packet.

The downstream data packet received by the ESGW device may be a downstream Ethernet data packet with a Virtual eXtensible Local Area Network (VXLAN) encapsulation sent by an application server (APP server) or a downstream Ethernet data packet sent by a Core Router (CR), etc. It is to be noted that: when the downstream data packet received by the ESGW device is a downstream Ethernet data packet with a VXLAN encapsulation, the ESGW device may remove the VXLAN encapsulation of the packet, and decapsulate the downstream Ethernet data packet without the VXLAN encapsulation to obtain a downstream IP data packet when determining that a destination MAC address of the downstream Ethernet data packet is the MAC address of the ESGW device.

At block 102, the ESGW device may determine an Address Resolution Protocol (ARP) entry of an IP address of a target user terminal based on a destination IP address of the downstream IP data packet, so as to obtain a session identifier (ID) of the target user terminal.

In an example of the present disclosure, after obtaining the IP data packet by decapsulating the received data packet, the ESGW device may search for an ARP entry matching the destination IP address of the IP data packet, and obtain the session ID of the target user terminal included in the matched ARP entry (referred to as the ARP entry of the IP address of the target user terminal).

At block 103, the ESGW device may determine a length field of a Point to Point Protocol over Ethernet (PPPOE) header by a microcode, and obtain a pre-stored fixed value field of the PPPOE header from a data storage area.

In an example of the present disclosure, after obtaining the session ID of the target user terminal, the ESGW device may carry the session ID of the target user terminal in an intra-chip forwarding header, i.e. a system header and send the same to an egress port, i.e., an egress port included in the target ARP entry.

The forwarding chip in the direction of the egress port may receive a packet with the system header, and obtain the session ID of the target user terminal from the system header and the fixed value field of the PPPOE header from the data storage area, respectively, and determine the length field of the PPPOE header by a microcode.

The fixed value field of the PPPOE header may be pre-stored in the data storage area of the ESGW device. For example, the EGR_PRGE_DATA entry in the ESGW device may be filled with a fixed value field of the PPPOE header when the ESGW device is initialized.

Determining the length field of the PPPOE header by a microcode as above may be specifically implemented using the following formula:

The length field of the PPPOE header=the total length of the packet forwarded inside the chip minus the length of the system header minus the length of the inner-layer Ethernet header type.

At block 104, the ESGW device may encapsulate the downstream IP data packet into a downstream PPPOE data packet based on the session ID of the target user terminal, the length field of the PPPOE header, and the fixed value field of the PPPOE header, and then forward the downstream PPPOE data packet through an egress port of the ARP entry of the IP address of the target user terminal.

In an existing implementation solution of BRAS virtualization, a gateway device cannot implement PPPOE encapsulation while performing layer-3 forwarding for a packet. In an example of the present disclosure, the ESGW device may acquire the session ID of the target user terminal, the length field of the PPPOE header, and the fixed value field of the PPPOE header, which are used by the ESGW device to perform a PPPOE encapsulation on the downstream IP data packet so as to obtain a downstream PPPOE data packet. Then the ESGW device may forward the downstream PPPOE data packet through an egress port of the ARP entry of the IP address of the target user terminal.

To help those skilled in the art to better understand the technical solutions in the examples of the present disclosure, the technical solutions in the examples of the present disclosure will be described below in conjunction with specific application scenarios.

Figure 2A:
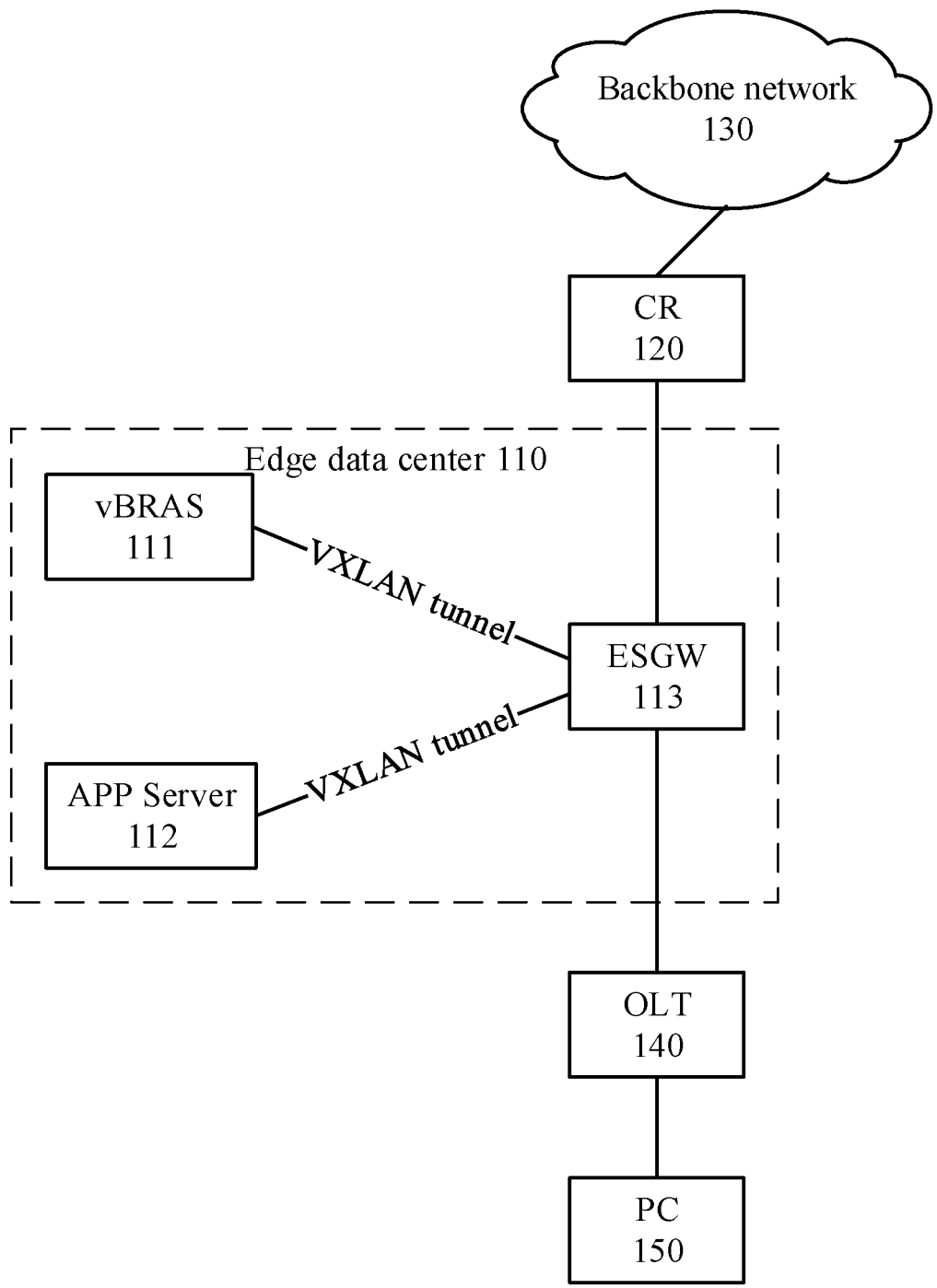
FIG. 2A is a schematic diagram illustrating a structure of a specific application scenario based on an example of the present disclosure.

FIG. 2A is a schematic diagram illustrating a structure of a specific application scenario based on an example of the present disclosure. As shown in FIG. 2A, in the application scenario, a Virtual Broadband Remote Access Server (vBRAS) device 111 and an APP server 112 may be deployed in an edge data center 110. A VXLAN tunnel is established between the vBRAS device 111 and an ESGW device 113, and between the APP server 112 and the ESGW device 113, respectively. The ESGW device 113 may be in a layer-3 intercommunication with a CR 120 so as to access a backbone network 130. A Personal Computer (PC) 150 may access the ESGW device 113 via an Optical Line Terminal (OLT) 140.

Based on the application scenario shown in FIG. 2A, the basic principle of the solution of forwarding a packet based on an example of the present disclosure is as follows.

I. Configuration Phase

First, on the ESGW device 113, an Access Control List (ACL) entry may be configured for a protocol packet from the PC 150, where the priority of the ACL entry is higher than the priority of an MAC entry.

Take a PPPOE protocol packet as an example of the protocol packet, the format of the ACL entry may be as shown in Table 1:

TABLE 1

| Matching item | Action item |
|---|---|
| An ingress port of a packet is a port via which the ESGW device is connected to the OLT device, where the packet carries a PPPOE protocol feature field. | The packet is redirected to a tunnel port of a VXLAN tunnel between the ESGW device and the vBRAS device. |
| . . . | . . . |

As shown in Table 1, an ingress port of a matching item of each ACL entry is a port connected to an OLT serving as an access device. The matching item of each ACL entry includes a packet type identifier, for example, the PPPOE protocol feature field as shown in Table 1.

A virtual interface on the vBRAS device 111 and a virtual interface on the ESGW device 113 may be configured with a same MAC address.

The fixed value field of the PPPOE header may be stored in the data storage area of the ESGW device 113, for example, in the EGR_PRGE_DATA entry.

II. Protocol Packet Interaction

Figure 2B:
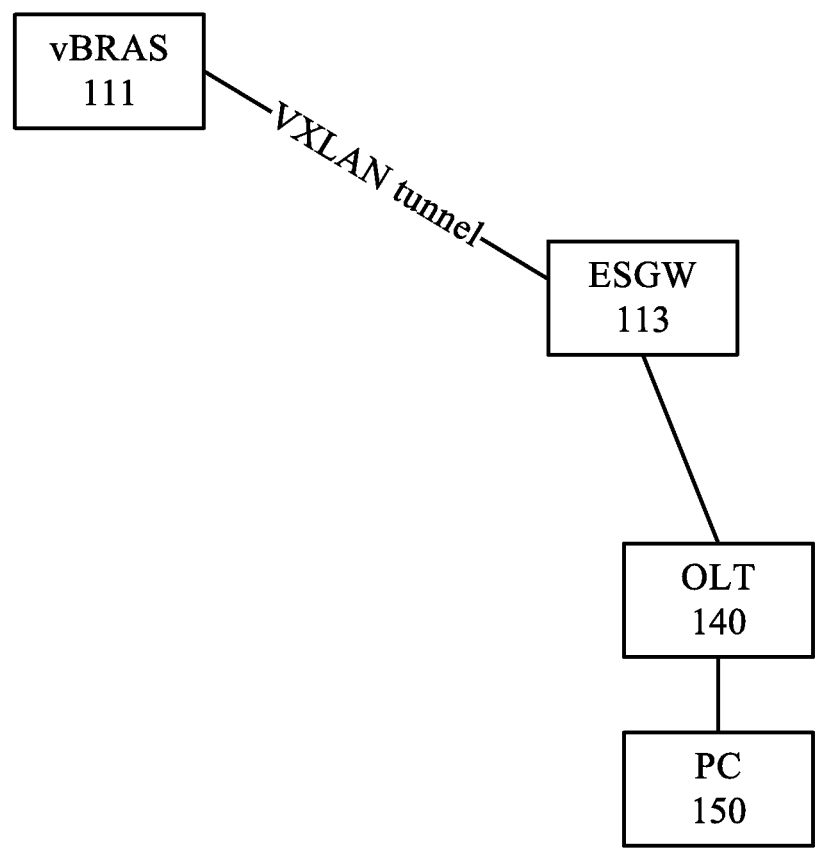
FIG. 2B is a schematic diagram illustrating a structure of a specific application scenario based on another example of the present disclosure.

As shown in FIG. 2B, in the example, the ESGW device 113 may process the PPPOE protocol packet in a manner as follows.

The PC 150 may send an upstream PPPOE protocol packet, which is then forwarded by the OLT 140 to the ESGW device 113. The ESGW device 113 may receive the upstream PPPOE protocol packet through a port connected to the OLT 140, search for an ACL entry matching the ingress port and a PPPOE protocol feature field, and perform a VXLAN encapsulation on the upstream PPPOE protocol packet based on an action item of the matching ACL entry, so as to obtain an upstream VXLAN-encapsulated PPPOE protocol packet. Thus, the ESGW device 113 may send the upstream VXLAN-encapsulated PPPOE protocol packet to the vBRAS device 111 through the VXLAN tunnel by which the ESGW device 113 is connected to the vBRAS device 111.

After receiving the upstream VXLAN-encapsulated PPPOE protocol packet, the vBRAS device 111 may remove the VXLAN encapsulation, and perform corresponding protocol processing on the upstream PPPOE protocol packet without the VXLAN encapsulation. Then the vBRAS device 111 may reply with a PPPOE protocol response packet, i.e. a downstream PPPOE protocol packet. The vBRAS device 111 may perform a VXLAN encapsulation on the downstream PPPOE protocol packet and send the packet to the ESGW device 113 based on a VXLAN tunnel corresponding to a destination MAC address of the downstream PPPOE protocol packet.

After receiving the VXLAN-encapsulated downstream PPPOE protocol packet, the ESGW device 113 may remove the VXLAN encapsulation, and perform layer-2 forwarding based on the destination MAC address of the downstream PPPOE protocol packet. That is, the ESGW device 113 may forward the packet to the OLT 140 serving as an access device through an egress port corresponding to the destination MAC address of the downstream PPPOE protocol packet so that the OLT 140 can forward the downstream PPPOE protocol packet to the PC 150.

The PPPOE protocol packet interaction between the PC 150 and the vBRAS device 111 may include a discovery phase and a session phase. The PC 150 and the vBRAS device 111 may acquire an MAC address from each other through the PPPOE protocol packet interaction in the discovery phase. In this example, the MAC address of the vBRAS device 111 acquired by the PC 150 is an MAC address of a virtual interface of the vBRAS device 111. The MAC address is same as an MAC address of a virtual interface of the ESGW device 113. The vBRAS device 111 will create a unique PPPOE session ID for the PC 150. Through the PPPOE protocol packet interaction in the session phase, the vBRAS device 111 may complete authentication of the PC 150 and allocate an IP address to the PC 150.

The specific PPPOE protocol packet interacted between the PC 150 and the vBRAS device 111 in the discovery phase and the session phase may be referred to the related description in a PPPOE protocol, which is not described herein in the examples of the present disclosure.

After confirming that the PC 150 is successfully authenticated and an IP address is allocated to the PC 150, the vBRAS device 111 may send the IP address of the PC 150, the MAC address of the PC 150, an egress port reaching the IP address of the PC 150, and the session ID of the PC 150 to the ESGW device 113, where the egress port reaching the IP address of the PC 150 may be a port via which the ESGW device 113 is connected to the OLT device 140.

After receiving the IP address of the PC 150, the MAC address of the PC 150, the egress port reaching the IP address of the PC 150 being the port via which the ESGW device 113 is connected to the OLT device 140, and the session ID of the PC 150 from the vBRAS device 111, the ESGW device 113 may generate an ARP entry of the IP address of the PC 150. The ARP entry records the IP address of the PC 150, the MAC address of the PC 150, the egress port, i.e., the port via which the ESGW device 113 is connected to the OLT device 140, and the session ID of the PC.

III. Data Packet Interaction

Figure 2C:
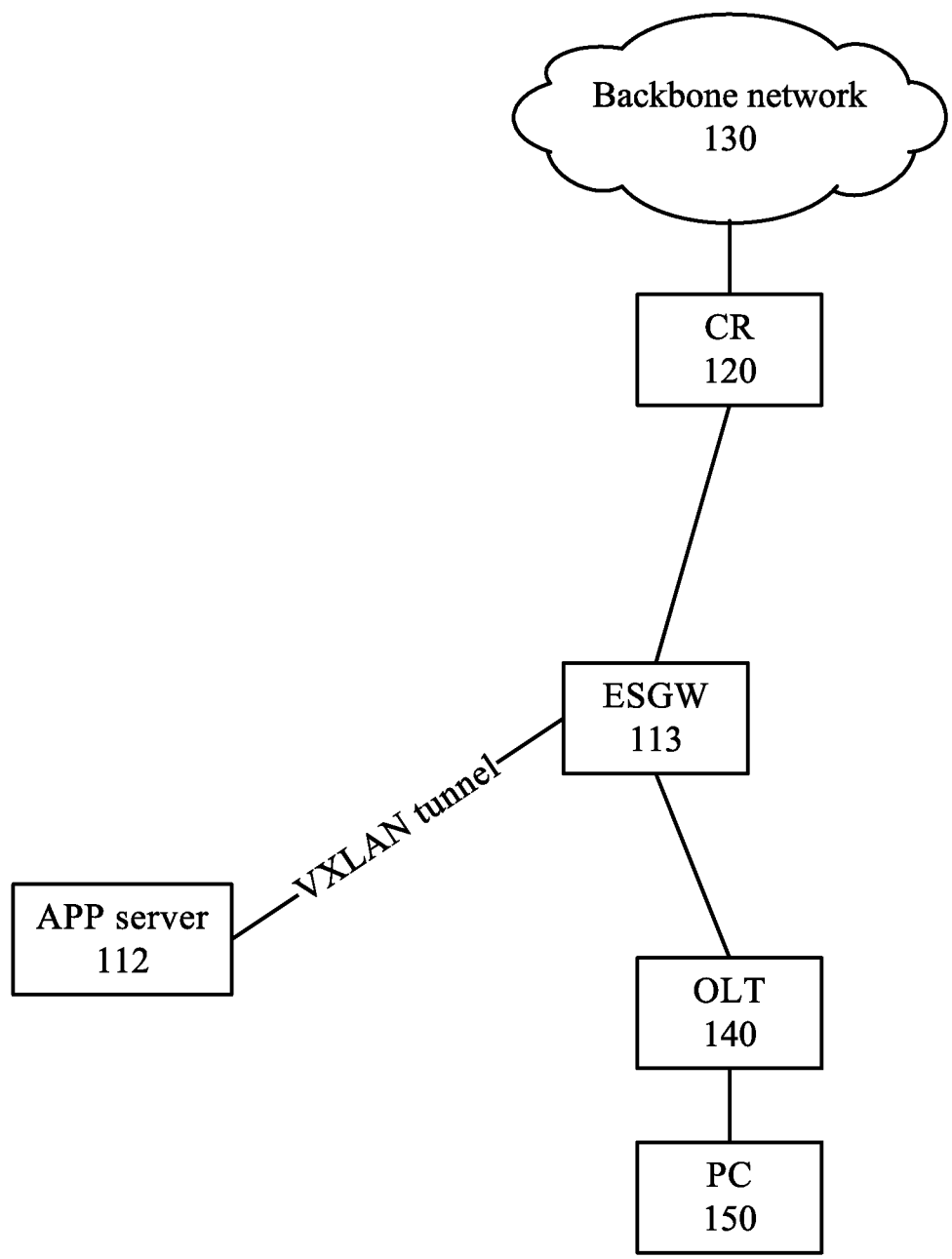
FIG. 2C is a schematic diagram illustrating a structure of a specific application scenario based on still another example of the present disclosure.

Referring to FIG. 2C, in this example, the data packet interaction between the PC 150 and the APP server 112 and between the PC 150 and the CR 120 may be performed as follows.

PC Sends a Data Packet to APP Server.

The ESGW device 113 may receive an upstream PPPOE data packet through the port connected to the OLT 140, and determine that a destination MAC address of the upstream PPPOE data packet is an MAC address of the ESGW device 113. Then, the ESGW device 113 may remove the PPPOE encapsulation from the upstream PPPOE data packet to obtain an upstream Ethernet data packet without PPPOE encapsulation, and remove the destination MAC address and a source MAC address from the upstream Ethernet data packet.

Next, the ESGW device 113 may search for an ARP entry matching a destination IP address of the upstream Ethernet data packet, and also obtain an MAC address corresponding to the destination IP address and a VXLAN tunnel as the VXLAN tunnel between the ESGW device 113 and the APP server 112. The ESGW device 113 and the APP server 112 may forward the ARP protocol packet through an existing VXLAN tunnel therebetween and learn the ARP entry from each other, which is not described herein.

Thereafter, the ESGW device 113 may re-encapsulate the upstream Ethernet data packet using the MAC address of the virtual interface as the source MAC address and the MAC address corresponding to the inner-layer destination IP address of the upstream Ethernet data packet as the destination MAC address. That is, the inner-layer IP packet of the original upstream Ethernet data packet may be encapsulated with a new Ethernet header. The ESGW device 113 may encapsulate the re-encapsulated upstream Ethernet data packet into an upstream VXLAN-encapsulated Ethernet data packet based on the VXLAN tunnel corresponding to the destination IP address of the re-encapsulated upstream Ethernet data packet, and send the VXLAN packet to the APP server 112 through an egress port of the VXLAN tunnel.

After receiving the upstream VXLAN-encapsulated Ethernet data packet, the APP server 112 may learn an MAC address entry based on the inner-layer source MAC address and the VXLAN tunnel. In this way, the APP server 112 will subsequently send the data packet sent to the PC 150 to the ESGW device 113 based on the learned MAC address entry for layer-3 forwarding.

PC Sends a Data Packet to CR

The ESGW device 113 may receive the upstream PPPOE data packet through the port connected to the OLT 140, and determine that the destination MAC address of the upstream PPPOE data packet is the MAC address of the ESGW device 113. The ESGW device 113 may remove the PPPOE encapsulation from the upstream PPPOE data packet to obtain an upstream Ethernet data packet without PPPOE encapsulation, remove the destination MAC address and the source MAC address from the upstream Ethernet data packet, search for a next-hop IP address of the destination IP address, and obtain an MAC address and an egress port (i.e., a port via which the ESGW device 113 is connected to the CR 120) corresponding to the next-hop IP address based on the ARP entry matching the next-hop IP address.

The upstream Ethernet data packet may be re-encapsulated using the MAC address of the virtual interface of the ESGW device 113 as a source MAC address and the MAC address corresponding to the next-hop IP address as a destination MAC address, and the re-encapsulated upstream Ethernet data packet may be then sent to the CR 120 through the egress port corresponding to the next-hop IP address.

In this way, the CR 120 may receive the upstream Ethernet data packet, and learn the MAC address entry based on the source MAC address and the port receiving the packet. The CR 120 may subsequently send the data packet to be sent to the PC 150 to the ESGW device 113 based on the learned MAC address entry for layer-3 forwarding.

APP Server Sends a Data Packet to PC

The ESGW device 113 may receive a downstream packet with a VXLAN encapsulation through a VXLAN tunnel between the ESGW device 113 and the APP server 112, and remove the VXLAN encapsulation. The ESGW device 113 may determine that a destination MAC address of the downstream Ethernet data packet without the VXLAN encapsulation is an MAC address of the ESGW device 113, decapsulate the downstream Ethernet data packet without the VXLAN encapsulation to obtain a downstream IP data packet, and determine a matching ARP entry of the IP address of the PC 150 based on a destination IP address of the downstream IP data packet. The ESGW device 113 may obtain a session ID included in the matched ARP entry as a session ID of the PC 150, and carry the session ID in an intra-chip forwarding header, for example, in a system header, and send it to an egress port, i.e., a port via which the ESGW device 113 is connected to the OLT 140.

The ESGW device 113 may calculate a length field of a PPPOE header using a microcode in the direction of the egress port, obtain the session ID of the PC 150 from the system header of the packet, obtain a pre-stored fixed value field of the PPPOE header from a data storage area, encapsulate a decapsulated IP data packet into a downstream PPPOE data packet based on the length field of the PPPOE header, the session ID of the PC 150, and the fixed value field of the PPPOE header and send the downstream PPPOE data packet to the OLT 140 via an egress port of the ARP entry of the IP address of the PC 150, i.e. a port via which the ESGW device 113 is connected to the OLT 140, so that the OLT 140 can forward the downstream PPPOE data packet to the PC 150.

CR Sends a Data Packet to PC

The ESGW device 113 may receive a downstream Ethernet data packet from the CR 120, determine that a destination MAC address of the downstream Ethernet data packet is an MAC address of the ESGW device 113, and decapsulate the downstream Ethernet data packet to obtain a downstream IP data packet. The ESGW device 113 may determine a matching ARP entry of the IP address of the PC 150 based on a destination IP address of the downstream IP data packet. The ESGW device 113 may obtain the session ID of the PC 150 included in the matching ARP entry, and carry the session ID in an intra-chip forwarding header, i.e. in a system header and send it to an egress port, i.e., a port via which the ESGW device 113 is connected to the OLT 140.

The ESGW device 113 may calculate a length field of a PPPOE header using a microcode in the direction of the egress port, obtain the session ID of the PC 150 from the system header of the packet, obtain a pre-stored fixed value field of the PPPOE header from a data storage area, encapsulate the downstream IP data packet into a downstream PPPOE data packet based on the length field of the PPPOE header, the session ID of the PC 150, and the fixed value field of the PPPOE header; and send the downstream PPPOE data packet to the OLT 140 through an egress port of the ARP entry of the IP address of the PC 150 i.e., a port via which the ESGW device 113 is connected to the OLT 140, so that the OLT 140 can forward the downstream PPPOE data packet to the PC 150.

As may be seen from the above description, in the technical solutions of the examples of the present disclosure, a ESGW device may decapsulate a downstream data packet into a downstream IP data packet when the downstream data packet is received and a destination MAC address of the downstream data packet is an MAC address of the ESGW device; determine a matching ARP entry of an IP address of a target user terminal based on a destination IP address of the downstream IP data packet, obtain a session ID of the target user terminal, determine a length field of a PPPOE header by a microcode, and obtain a pre-stored fixed value field of the PPPOE header from a data storage area. Further, the ESGW device may encapsulate the downstream IP data packet into a downstream PPPOE data packet based on the session ID of the target user terminal, the length field of the PPPOE header, and the fixed value field of the PPPOE header, and forward the downstream PPPOE data packet through an egress port included in the ARP entry of the IP address of the target user terminal so that the gateway device can implement a PPPOE encapsulation while performing layer-3 forwarding for a packet.

The above descriptions are made to the method provided based on the present disclosure. An apparatus in the present disclosure will be described below.

Figure 3:
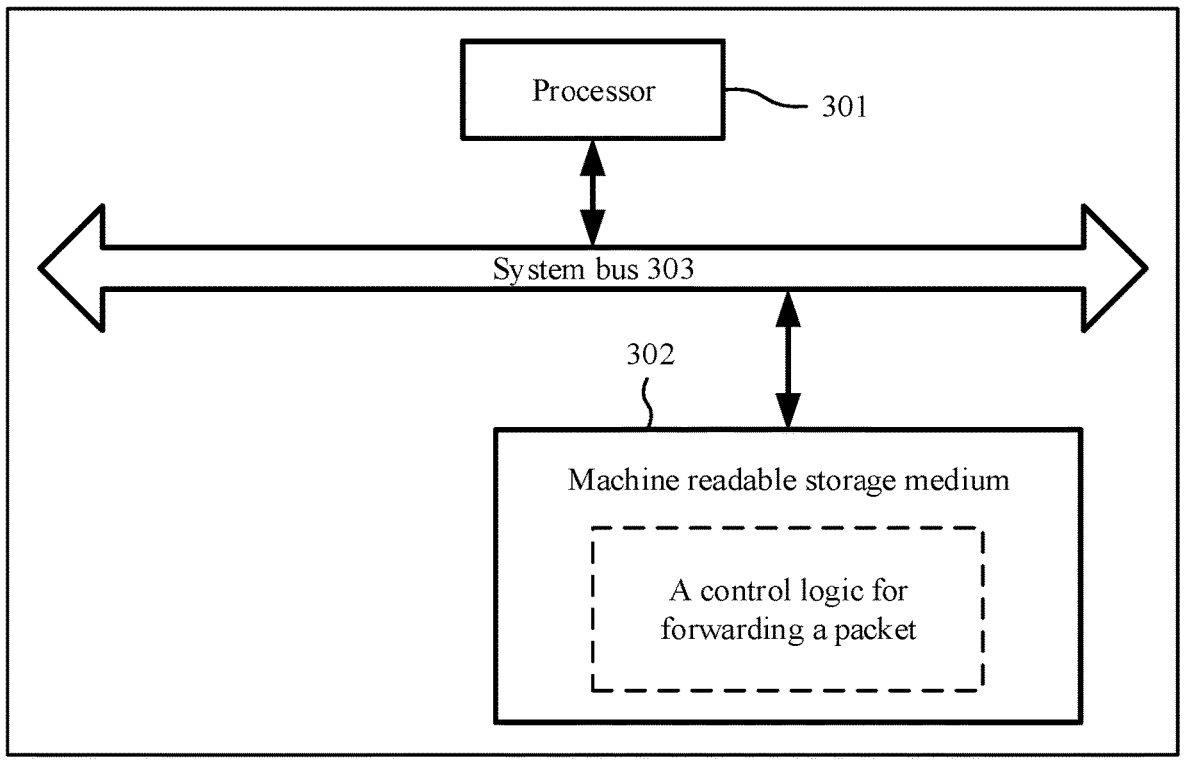
FIG. 3 is a schematic diagram illustrating a hardware structure of an apparatus for forwarding a packet based on an example of the present disclosure.

FIG. 3 is a schematic diagram illustrating a hardware structure of an apparatus for forwarding a packet based on an example of the present disclosure. The apparatus for forwarding a packet may be applied to an ESGW device. As shown in FIG. 3, the apparatus for forwarding a packet may include a processor 301 and a machine-readable storage medium 302 storing machine-executable instructions. The processor 301 may communicate with the machine-readable storage medium 302 via a system bus 303. Moreover, by reading and executing the machine-executable instructions corresponding to a control logic for forwarding a packet and stored in the machine-readable storage medium 302, the processor 301 may be caused to execute the above method of forwarding a packet.

The machine-readable storage medium 302 mentioned herein may be any of electronic, magnetic, optical, or other physical storage devices and may contain or store information such as executable instructions, data, etc. For example, the machine-readable storage medium may be a volatile memory, a non-volatile memory, or other type of storage medium. For example, the machine readable storage medium may be: a Radom Access Memory (RAM), a flash memory, a storage drive (e.g. hard disk drive), a solid state hard disk, a storage disk (e.g., optical disk, Digital Video Disk (DVD)), or a combination thereof.

Figure 4:
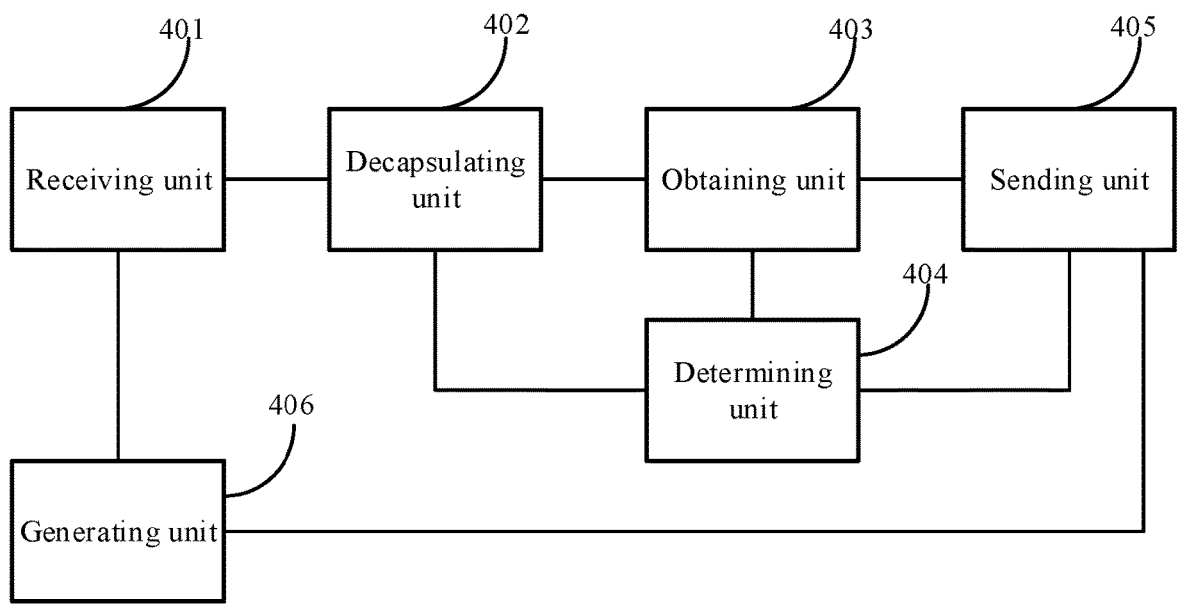
FIG. 4 is a functional structure diagram illustrating a control logic for forwarding a packet based on an example of the present disclosure.

As shown in FIG. 4, the above control logic for forwarding a packet may functionally include a receiving unit 401, a decapsulating unit 402, an obtaining unit 403, a determining unit 404, and a sending unit 405.

The receiving unit 401 is configured to receive a downstream data packet.

The decapsulating unit 402 is configured to decapsulate the downstream data packet to obtain a downstream IP data packet when a destination MAC address of the downstream data packet received by the receiving unit 401 is an MAC address of an ESGW device.

The obtaining unit 403 is configured to obtain a session ID of a target user terminal by matching an ARP entry of an IP address of the target user terminal based on a destination IP address of the downstream IP data packet.

The determining unit 404 is configured to determine a length field of a PPPOE header by a microcode. For example, the determining unit 404 may determine the length field of the PPPOE header by a microcode based on the following formula:

The length field of a PPPOE header=the total length of a packet forwarded inside a chip minus the length of a system header minus the length of an inner-layer Ethernet header type.

The obtaining unit 403 is further configured to obtain a pre-stored fixed value field of the PPPOE header from a data storage area.

The sending unit 405 is configured to encapsulate the downstream IP data packet into a downstream PPPOE data packet based on the session ID of the target user terminal, the length field of the PPPOE header, and the fixed value field of the PPPOE header, and forward the downstream PPPOE data packet through an egress port of the ARP entry of the IP address of the target user terminal.

In an example, the receiving unit 401 is further configured to receive the IP address of the target user terminal, an MAC address of the target user terminal, an egress port reaching the target user terminal being a port connected to an access device, and the session ID of the target user terminal from a Virtual Broadband Remote Access Server (vBRAS) device; where the target user terminal is connected to the ESGW device through the access device.

In this case, as shown in FIG. 4, the control logic for forwarding a packet as described above may further include a generating unit 406 configured to generate the ARP entry of the IP address of the target user terminal; where the ARP entry of the IP address of the target user terminal records that the IP address of the target user terminal corresponds to the MAC address of the target user terminal, the port connected to the access device, and the session ID of the target user terminal.

In an example, when the downstream data packet received by the receiving unit 401 is a downstream Ethernet data packet with a VXLAN encapsulation, the decapsulating unit 402 is further configured to remove the VXLAN encapsulation.

When the destination MAC address of the downstream Ethernet data packet without the VXLAN encapsulation is determined as the MAC address of the ESGW device, the decapsulating unit 402 is specifically configured to decapsulate the downstream Ethernet data packet without the VXLAN encapsulation to obtain the downstream IP data packet.

In an example, when the downstream data packet received by the receiving unit 401 is a downstream Ethernet data packet and the destination MAC address of the downstream Ethernet data packet is the MAC address of the ESGW device, the decapsulating unit 402 is specifically configured to decapsulate the downstream Ethernet data packet to obtain the downstream IP data packet.

In an example, the determining unit 404 is specifically configured to determine the length field of the PPPOE header by a microcode based on the following formula:

The length field of the PPPOE header=the total length of the packet forwarded inside the chip minus the length of the system header minus the length of the inner-layer Ethernet header type.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The foregoing disclosure is merely illustrative of preferred examples of the present disclosure but not intended to limit the present disclosure, and any modifications, equivalent substitutions, adaptations thereof made within the spirit and principles of the disclosure shall be encompassed in the scope of protection of the present disclosure.

The invention claimed is:

1. A method of forwarding a packet, executed by an Edge Stream Gateway (ESGW) device, comprising:
   receiving a downstream data packet;
   when determining that a destination Media Access Control (MAC) address of the downstream data packet is an MAC address of the ESGW device,
      decapsulating the downstream data packet to obtain a downstream Internet Protocol (IP) data packet;
   obtaining a session identifier (ID) of a target user terminal by matching an Address Resolution Protocol (ARP) entry of an IP address of the target user terminal based on a destination IP address of the downstream IP data packet, and;
   determining a length field of a Point to Point Protocol over Ethernet (PPPOE) header, and obtaining a pre-stored fixed value field of the PPPOE header from a data storage area;
   encapsulating the downstream IP data packet into a downstream PPPOE data packet based on the session ID of the target user terminal, the length field of the PPPOE header, and the fixed value field of the PPPOE header, and
   forwarding the downstream PPPOE data packet through an egress port of the ARP entry of the IP address of the target user terminal.

2. The method according to claim 1, wherein before receiving the downstream data packet, the method further comprises:
   receiving the IP address of the target user terminal, an MAC address of the target user terminal, an egress port reaching the target user terminal being a port connected to an access device, and the session ID of the target user terminal from a Virtual Broadband Remote Access Server (vBRAS) device; wherein the target user terminal is connected to the ESGW device through the access device; and
   generating the ARP entry of the IP address of the target user terminal; wherein the ARP entry of the IP address of the target user terminal records that the IP address of the target user terminal corresponds to the MAC address of the target user terminal, the port connected to the access device, and the session ID of the target user terminal.

3. The method according to claim 1, wherein decapsulating the downstream data packet to obtain the downstream IP data packet comprises:
   in a case that the downstream data packet is a downstream Ethernet data packet with a Virtual eXtensible Local Area Network (VXLAN) encapsulation,
      removing the VXLAN encapsulation; and
   when determining that the destination MAC address of the downstream Ethernet data packet without the VXLAN encapsulation is the MAC address of the ESGW device,
      decapsulating the downstream Ethernet data packet without the VXLAN encapsulation to obtain the downstream IP data packet.

4. The method according to claim 1, wherein decapsulating the downstream data packet to obtain the downstream IP data packet comprises:
   in a case that the downstream data packet is a downstream Ethernet data packet and the destination MAC address of the downstream Ethernet data packet is the MAC address of the ESGW device,
   decapsulating the downstream Ethernet data packet to obtain the downstream IP data packet.

5. The method according to claim 1, wherein the length field of the PPPOE header is determined by a microcode based on the following formula:
   a length field of a PPPOE header=a total length of a packet forwarded inside a chip minus a length of a system header minus a length of an inner-layer Ethernet header type.

6. An apparatus for forwarding a packet applied to an Edge Stream gateway (ESGW) device, comprising:
   a receiving unit configured to receive a downstream data packet;
   a decapsulating unit configured to decapsulate the downstream data packet to obtain a downstream Internet Protocol (IP) data packet in a case that a destination Media Access Control (MAC) address of the downstream data packet received by the receiving unit is an MAC address of the ESGW device;
   an obtaining unit configured to obtain a session identifier (ID) of a target user terminal by matching an Address Resolution Protocol (ARP) entry of an IP address of the target user terminal based on a destination IP address of the downstream IP data packet;
   a determining unit configured to determine a length field of a Point to Point Protocol over Ethernet (PPPOE) header;
   wherein the obtaining unit is further configured to obtain a pre-stored fixed value field of the PPPOE header from a data storage area; and
   a sending unit configured to encapsulate the downstream IP data packet into a downstream PPPOE data packet based on the session ID of the target user terminal, the length field of the PPPOE header, and the fixed value field of the PPPOE header, and forward the downstream PPPOE data packet through an egress port of the ARP entry of the IP address of the target user terminal.

7. The apparatus according to claim 6, wherein
the receiving unit is further configured to receive the IP address of the target user terminal, an MAC address of the target user terminal, an egress port reaching the target user terminal being a port connected to an access device, and the session ID of the target user terminal from a Virtual Broadband Remote Access Server (vBRAS) device; wherein the target user terminal is connected to the ESGW device through the access device;
the apparatus further comprises:
a generating unit configured to generate the ARP entry of the IP address of the target user terminal; wherein the ARP entry of the IP address of the target user terminal records that the IP address of the target user terminal corresponds to the MAC address of the target user terminal, the port connected to the access device, and the session ID of the target user terminal.

8. The apparatus according to claim 6, wherein
in a case that the downstream data packet received by the receiving unit is a downstream Ethernet data packet with a Virtual eXtensible Local Area Network (VXLAN) encapsulation,
the decapsulating unit is further configured to remove the VXLAN encapsulation; and
when determining that the destination MAC address of the downstream Ethernet data packet without the VXLAN encapsulation is the MAC address of the ESGW device,
the decapsulating unit is specifically configured to decapsulate the downstream Ethernet data packet without the VXLAN encapsulation to obtain the downstream IP data packet.

9. The apparatus according to claim 6, wherein
in a case that the downstream data packet received by the receiving unit is a downstream Ethernet data packet and the destination MAC address of the downstream Ethernet data packet is the MAC address of the ESGW device,
the decapsulating unit is specifically configured to decapsulate the downstream Ethernet data packet to obtain the downstream IP data packet.

10. The apparatus according to claim 6, wherein the determining unit is specifically configured to determine the length field of the PPPOE header by a microcode based on the following formula:
a length field of a PPPOE header=a total length of a packet forwarded inside a chip minus a length of a system header minus a length of an inner-layer Ethernet header type.

11. An apparatus for forwarding a packet, the apparatus being applied to an Edge Stream gateway (ESGW) device, comprising:
a machine-readable storage medium storing machine-executable instructions; and
a processor in communication with the machine-readable storage medium; when executing the machine-executable instructions, the processor is caused to execute:
receiving a downstream data packet;
when determining that a destination Media Access Control (MAC) address of the downstream data packet is an MAC address of the ESGW device, decapsulating the downstream data packet to obtain a downstream Internet Protocol (IP) data packet;
obtaining a session identifier (ID) of a target user terminal by matching an Address Resolution Protocol (ARP) entry of an IP address of the target user terminal based on a destination IP address of the downstream IP data packet, and;
determining a length field of a Point to Point Protocol over Ethernet (PPPOE) header, and obtaining a pre-stored fixed value field of the PPPOE header from a data storage area;
encapsulating the downstream IP data packet into a downstream PPPOE data packet based on the session ID of the target user terminal, the length field of the PPPOE header, and the fixed value field of the PPPOE header, and
forwarding the downstream PPPOE data packet through an egress port of the ARP entry of the IP address of the target user terminal.

12. The apparatus according to claim 11, wherein when executing the machine-executable instructions, the processor is further caused to execute:
receiving the IP address of the target user terminal, an MAC address of the target user terminal, an egress port reaching the target user terminal being a port connected to an access device, and the session ID of the target user terminal from a Virtual Broadband Remote Access Server (vBRAS) device; wherein the target user terminal is connected to the ESGW device through the access device; and
generating the ARP entry of the IP address of the target user terminal; wherein the ARP entry of the IP address of the target user terminal records that the IP address of the target user terminal corresponds to the MAC address of the target user terminal, the port connected to the access device, and the session ID of the target user terminal.

13. The apparatus according to claim 11, wherein when executing the machine-executable instructions, the processor is further caused to execute:
in a case that the downstream data packet is a downstream Ethernet data packet with a Virtual eXtensible Local Area Network (VXLAN) encapsulation,
removing the VXLAN encapsulation; and
when determining that the destination MAC address of the downstream Ethernet data packet without the VXLAN encapsulation is the MAC address of the ESGW device,
decapsulating the downstream Ethernet data packet without the VXLAN encapsulation to obtain the downstream IP data packet.

14. The apparatus according to claim 11, wherein when executing the machine-executable instructions, the processor is further caused to execute:
in a case that the downstream data packet is a downstream Ethernet data packet and the destination MAC address of the downstream Ethernet data packet is the MAC address of the ESGW device,
decapsulating the downstream Ethernet data packet to obtain the downstream IP data packet.

15. The apparatus according to claim 11, wherein the length field of the PPPOE header is determined by a microcode based on the following formula:
a length field of a PPPOE header=a total length of a packet forwarded inside a chip minus a length of a system header minus a length of an inner-layer Ethernet header type.

* * * * *